T. P. TUITE.
APPARATUS FOR MAKING EXTRACTS.
APPLICATION FILED MAY 8, 1917.
1,365,068.
Patented Jan. 11, 1921.
2 SHEETS—SHEET 1.
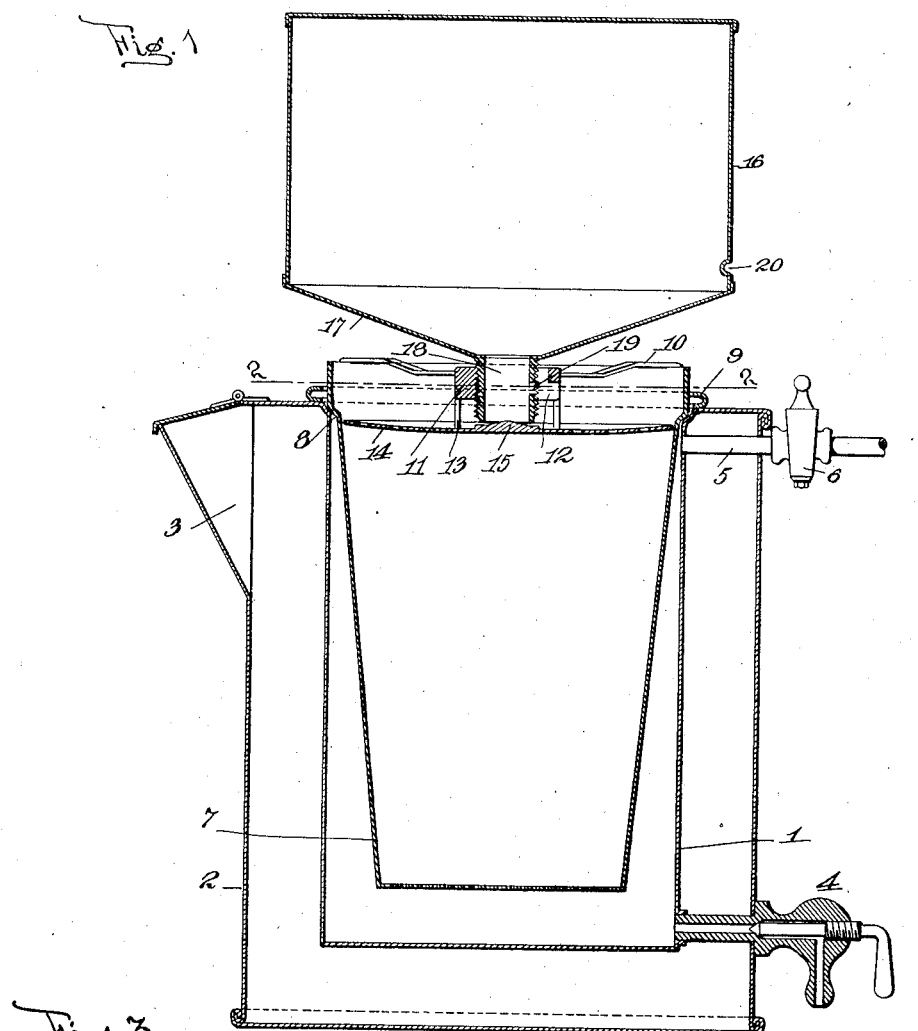
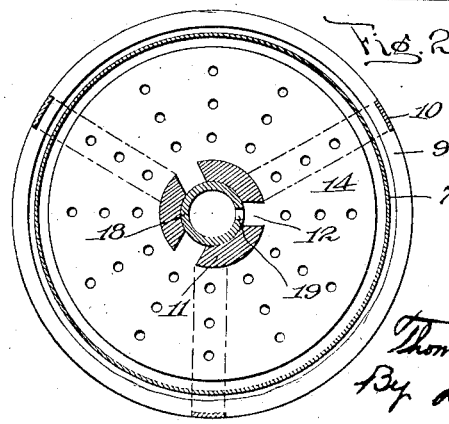
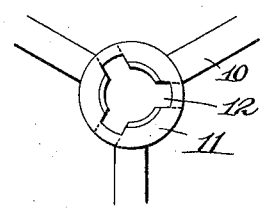
Inventor
Thomas P. Tuite,
By Dyer & Taylor
Attorneys

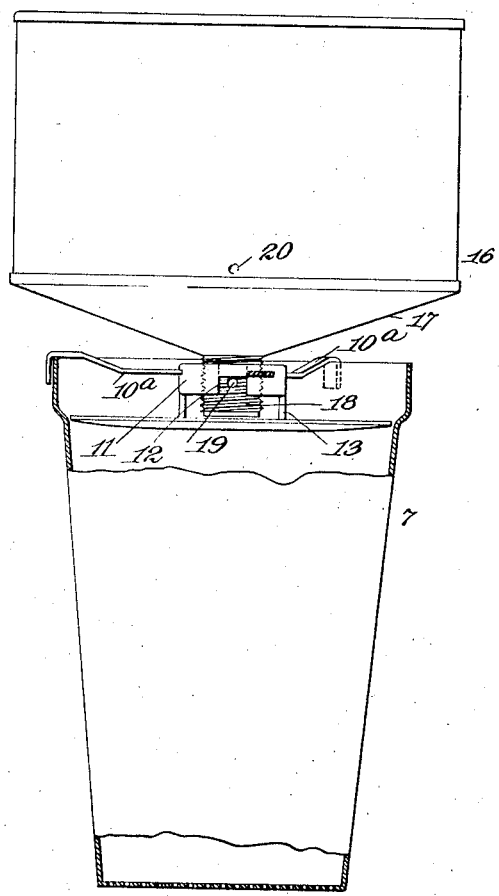

UNITED STATES PATENT OFFICE.

THOMAS P. TUITE, OF NEW YORK, N. Y.

APPARATUS FOR MAKING EXTRACTS.

1,365,068.     Specification of Letters Patent.     Patented Jan. 11, 1921.

Application filed May 8, 1917. Serial No. 167,162.

*To all whom it may concern:*

Be it known that I, THOMAS P. TUITE, a citizen of the United States, residing in the borough of Manhattan, city, county, and State of New York, have invented a new and useful Apparatus for Making Extracts, of which the following is a specification.

My invention relates to the making of extracts from materials which have been reduced to a finely divided state and to extracting certain desirable properties from the material without extracting certain undesirable properties.

My invention relates particularly to making extracts of coffee whereby the aromatic and stimulating ingredients such as caffein may be extracted without extracting the undesirable, bitter ingredients except in so far as the latter may be desired by the consumer.

The object of my invention is to produce, from a substance in a finely divided state, an infusion in which certain of the ingredients of the material will be entirely extracted and other ingredients will be partly extracted.

A further object is to regulate the amount of extraction of those ingredients which are not to be wholly extracted.

A further object is to produce an apparatus for making extracts wherein the flow of the fluid may be regulated and wherein the flow of the extracting fluid may be automatically arrested.

These and further objects will more fully appear in the following specification and accompanying drawings considered together or separately.

Coffee as ordinarily prepared and consumed is a decoction produced by boiling the ground or pulverized roasted coffee bean, or permitting boiling water to pass through the ground coffee as in the so-called percolators. By both of these processes the boiling water not only extracts the aromatic and exhilarating principle, which to the best of my knowledge is caffein, but also extracts other and undesirable principles such as resin, oil, tannin and possibly other ingredients which give the decoction its characteristic, bitter taste. The more the coffee is boiled or the longer the boiling water is permitted to pass through it the more bitter the decoction becomes.

By my invention I may extract only the aromatic and exhilarating properties from the coffee but as the public has become accustomed to the bitter taste in the beverage I provide means whereby the bitter and medicinally undesirable, properties may be given to the product to the extent desired by the consumer.

I have illustrated one embodiment of my invention in the accompanying drawings in which like parts in all of the figures are designated by similar characters of reference, and in which—

Figure 1 is a longitudinal section of the preferred form of my invention.

Fig. 2 is a detail section taken on the line 2—2 of Fig. 1.

Fig. 3 is a detail plan view of the water reservoir support, and

Fig. 4 is a side elevation, partly in section, of a modification.

In carrying out my invention I provide a receptacle 1 for receiving the extract which is preferably surrounded by a water jacket 2, having a filling opening 3. The receptacle 1 is provided at or near its bottom with a draw-off cock 4 and near its top with an overflow pipe 5 provided with a cock 6. The upper end of the receptacle 1 is open.

A coffee container 7 rests within the open end of the receptacle and is supported by the upper edge thereof. The bottom 8 of the container is perforated whereby liquid leaching through the coffee in the container may escape into the receptacle 1. The upper edge of the container is on a higher level than the top of the receptacle 1 and is bulged outward as at 8 to provide means for supporting the container in the mouth of the receptacle.

A ring 9 rests upon the top of the receptacle 1 and is provided with inwardly projecting arms 10 which extend upwardly so as to pass over the top edge of the container. Carried by the inner ends of the arms 10 is an interiorly screw threaded member 11. The member 11 is provided with a plurality of radial recesses 12 which extend from the periphery of the member to the bore thereof and which, in part, extend radially through the member. Supported from the member 11 by means of legs 13 is a perforated distributer plate or disk 14 of a size to readily enter the container below the bulge 8. The center of the disk 14 is provided with an upward projection 15 forming a valve.

In connection with the parts of the device above described I provide a water reservoir 16 which preferably has a conical bottom 17 which carries at its apex a short section of tubing 18. The exterior of the tube 18 is screw threaded to fit the threads in the member 11. The tube is perforated as at 19 to form a vent and the side wall of the reservoir is marked as at 20 on a radial line with said vent.

The form of device as above described may be supported on a stand of any form so that an article of any desired form may be placed beneath the cock 4 to receive the contents of the receptacle when the cock is opened. If desired the water jacket may be heated as by means of a spirit lamp (not shown).

In the embodiment of the invention illustrated in Fig. 4 the water jacketed receptacle is dispensed with and the extract is caught in a vessel as it drops from the bottom of the container. In this case the ring 9 is omitted and arms 10ª engage the top of the container and support the member 11 and the reservoir 16.

In Fig. 5 I have shown a form of the device in which an unjacketed receptacle 21 having an overflow pipe 22 is used.

The operation of the embodiment of the invention illustrated in Figs. 1, 2 and 3 is as follows:—

The roasted coffee beans are finely pulverized in order that all of the cells, especially those containing the aromatic principle, are broken. The powder is then placed in the container 7 which is placed in position within the receptacle 1. The water jacket 2 is filled with boiling water. The member 11 is unscrewed from the tubular neck of the reservoir and the latter is inverted and filled, through the tube 18, with boiling water. The member 11 is now screwed down the tube until the open end of the tube engages the projection 15 of the disk 14. The projection acting as a valve will prevent the water from escaping when the reservoir is reverted. When the projection is seated in the end of the tube the vent 19 is midway between two of the chambers 12 or at least is opposite a solid portion of the member 11 and no air can enter the reservoir 16.

The reservoir with the spreader disk in position is now placed over the top of the container as shown in Fig. 1. The reservoir is now rotated relatively to the member 11 thereby raising the tube from the seat 15 at the same time the vent 19 is brought into communication with one of the recesses 12 and air entering the reservoir through the vent 19 will permit water to flow from the reservoir, spread over the disk 14, penetrate the perforations therein and seep through the coffee in the container and escape bearing with it the easily soluble aromatic principles of the coffee. The water in the jacket will have been lowered in temperature to a point below the boiling point before the seepage will emerge from the bottom of the container. The water in the reservoir will fall below the boiling point before leaving the tube 18 so that the powdered coffee is not subjected to a boiling operation.

If it is desired to use the extract leached out of the coffee as above described the cock 4 is opened and the extract collected in a vessel. When a cup of coffee is wanted enough of the extract to give the desired strength is placed in a cup of water either hot or cold as desired. The water forming the liquid part of the extract having passed through the coffee but once the beverage will be aromatic and mildly stimulating but will lack the bitter taste desired by most people In order to obtain the desired taste the cock 4 is closed and the extract remains in the receptacle and its level rises so that the coffee in the container is soaked and an infusion is produced by such soaking in conjunction with the leaching. Before the infusion reaches the top of the receptacle its level will reach the bottom of the tube 18 and the supply of water will be automatically arrested. The coffee may soak as long as desired and the infusion may then be drawn off through the cock 4.

If it is desired to operate the device continuously the cock 4 is closed and the cock 8 opened; then as the level of the infusion reaches the pipe 5 it will escape from the receptacle. The material in the container will be permitted to soak in the fluid and the length of time of the soaking operation will depend upon the amount of water flowing from the tank 16. If the vent be opened to permit the entrance of a minimum amount of air a minimum amount of liquid will escape from the tank, and the flow of the liquid from the tank 16 and through the pipe 5, while being continuous, will be slow, and the period of soaking will be long, while if the tube and vent be opened to permit the passage of as much water as the pipe 5 can carry off, the liquid will pass through the container at a faster rate and the pulverized material will be soaked for a shorter period of time relatively to the amount of liquid in transit.

The vent may be adjusted to admit any amount of air up to the maximum and the length of time the coffee is soaked will be determined by the amount of air entering the reservoir and consequently by the amount of water escaping therefrom.

In Fig. 4 is shown an embodiment of the invention wherein a continuous process without soaking is employed. The container 7 is filled, or partly filled, with pulverized coffee, for example. The reservoir is filled with water of ordinary temperature. The reservoir is inverted over the top of the container as shown. The container is placed over a receptacle, such as a cup. The water will escape from the reservoir, be spread over the surface of the coffee, as before and seep through the powdered coffee and escape through the bottom of the container into the receptacle. The rapidity of the leaching will depend upon the rate at which the water is permitted to escape from the reservoir and the density to which the pulverized material is packed.

By the above described process only the aromatic principles of the coffee are extracted and least objectionable beverage produced.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having thus described my invention what I now claim as new and desire to secure by Letters Patent, is:

1. A device of the character described which comprises a container for pulverized material, a reservoir, there being an opening offering communication between the reservoir and the container, and means for adjusting the position of the reservoir relatively to the container to vary the extent of the opening.

2. A device of the character described which comprises a container for pulverized material, a reservoir, there being an opening offering communication with the container, an air vent in the reservoir, means for simultaneously adjusting the size of the vent and opening.

3. A device of the character described which comprises a container for pulverized material, a reservoir communicating with the container, an air vent in the reservoir, means for adjusting the size of the vent, and means for simultaneously adjusting the position of the reservoir relatively to the container to vary the extent of the communication.

4. A device of the character described which comprises a container for pulverized material, a water reservoir, there being an opening offering communication between the reservoir and the container, means for adjusting the position of the reservoir relatively to the container, a receptacle surrounding the container, the opening being so positioned and arranged that said opening will be sealed when the water in the container reaches a predetermined level, and means for removing material from the receptacle.

5. A device of the character described, comprising a container for pulverized material, said container having an open top and a perforated bottom, a reservoir supported above the container, there being a passage between the reservoir and the container, a valve for closing the passage, means for regulating the valve opening, and means for simultaneously venting the reservoir.

6. A device of the character described, comprising a container for pulverized material, said container having an open top and a perforated bottom, a water reservoir supported above the container, there being a passage between the reservoir and the container, a valve for closing the passage, means for regulating the valve opening, means for venting the reservoir, a receptacle surrounding the container, the height of the receptacle being such that the passage will be closed before the liquid in the receptacle reaches the upper edge thereof.

7. A device of the character described, comprising a container for pulverized material, said container having an open top and a perforated bottom, a reservoir supported above the container, there being a passage between the reservoir and the container, a valve for closing the passage, means for regulating the valve opening, and for simultaneously venting the reservoir, a receptacle surrounding the container, and a water jacket surrounding the receptacle.

8. A device of the character described comprising a container for pulverized material, a reservoir mounted above the container, said reservoir containing a fluid, a tube for permitting egress of the fluid, a member engaging the tube, there being an opening in the member, a vent in the tube, a valve for closing the tube, said reservoir being rotatable in the member whereby the tube may be raised from its valve seat and the vent brought into coincidence with the opening in the member to permit the entrance of air to the reservoir and allow the egress of fluid from the tube, there being perforations in the container to permit the escape of seepage from the container, a receptacle for receiving the seepage, the open end of the tube being below the top of the receptacle, means for withdrawing the seepage from the receptacle, a water jacket surrounding the receptacle, and means for filling the water jacket.

9. A device of the character described, comprising a container, a reservoir, there being means of communication between the reservoir and container, said container being open to the atmosphere, a valve for shutting off communication between the reservoir and container, means for opening said valve, there being means permitting the entrance of air to the reservoir, and means independent of the valve for interrupting the communication between the reservoir and container.

This specification signed and witnessed this second day of May, 1917.

THOMAS P. TUITE.

Witnesses:
A. E. RENTON,
J. G. McDERMOTT.